United States Patent [19]
Bessant et al.

[11] 3,960,508
[45] June 1, 1976

[54] TROUGH-TYPE SCALE TRAPS

[75] Inventors: Glyndwr A. R. Bessant, Morristown; Paul D. Eichamer, Ironia; Robert M. Koros, Westfield; Steven R. Schieni, Morristown, all of N.J.

[73] Assignee: Exxon Research and Engineering Company, Linden, N.J.

[22] Filed: Nov. 4, 1974

[21] Appl. No.: 520,485

[52] U.S. Cl. ............................. 23/288 R; 208/146; 23/284; 55/308; 55/529; 55/484
[51] Int. Cl.² ...................... B01J 8/00; B01D 50/00
[58] Field of Search .................. 23/288 R, 289, 284; 208/146, 149, 88, 251; 55/341, 307, 308, 529, 484

[56] References Cited
UNITED STATES PATENTS

| | | | |
|---|---|---|---|
| 3,006,740 | 10/1961 | Maggio | 208/146 X |
| 3,691,736 | 9/1972 | Neumann | 55/484 |
| 3,824,080 | 7/1974 | Smith et al. | 208/146 X |
| 3,824,081 | 7/1974 | Smith et al. | 208/146 X |

*Primary Examiner*—James H. Tayman, Jr.
*Attorney, Agent, or Firm*—H. N. Wells; F. D. Paris

[57] ABSTRACT

A trough-type scale trap for use with a refinery or chemical plant reactor having a catalyst bed subject to plugging by fine particles. Compared to prior art traps, the trough-type scale trap of the invention is characterized by a larger volumetric capacity and screen area and is substantially easier to construct and to install or remove from closed reactor vessels than conventional traps. Its typical embodiment is as a series of parallel troughs having rectangular openings and disposed chordally across the reactor normal to the direction of flow. In one embodiment, the trough is a rectangular parallelepiped; in another embodiment, the substantially rectangular opening is reduced by tapering to a bottom significantly smaller than the inlet opening.

10 Claims, 10 Drawing Figures

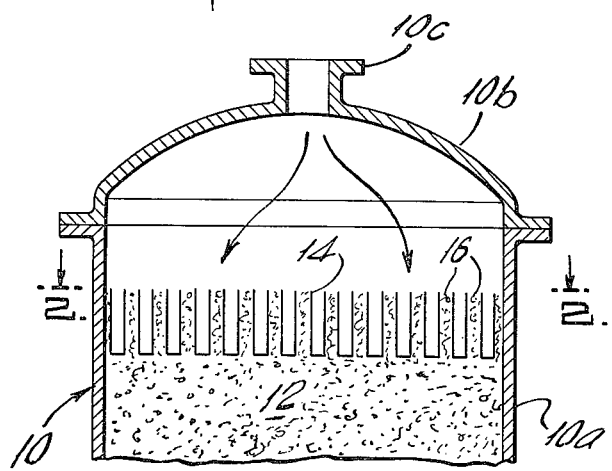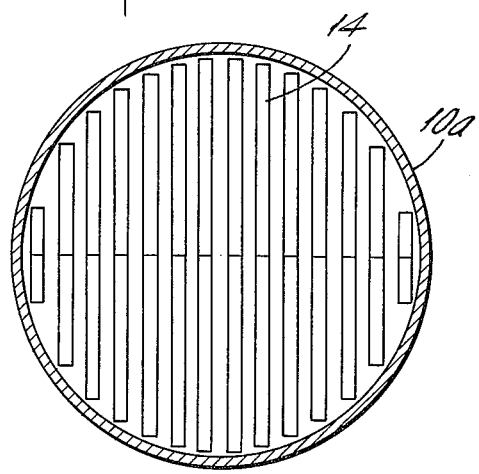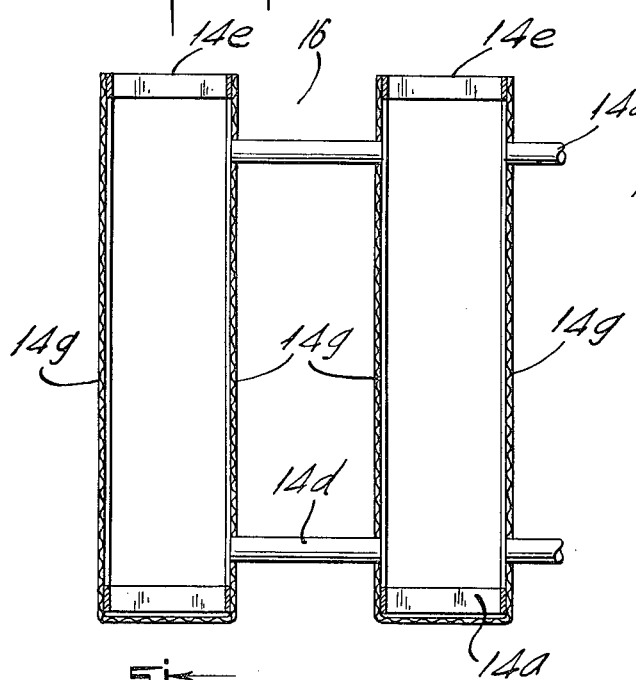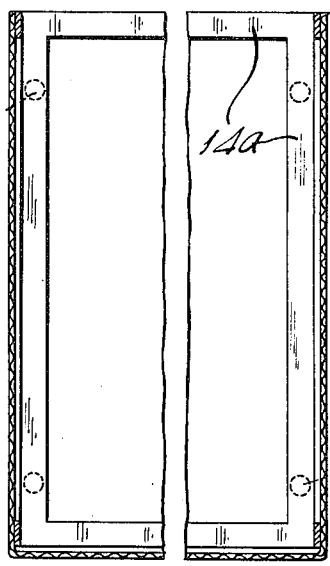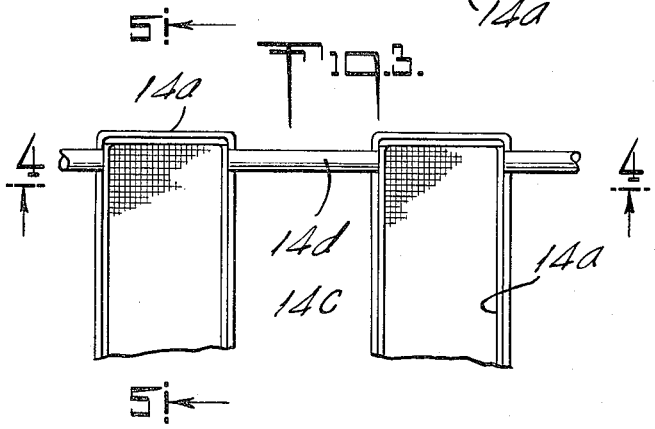

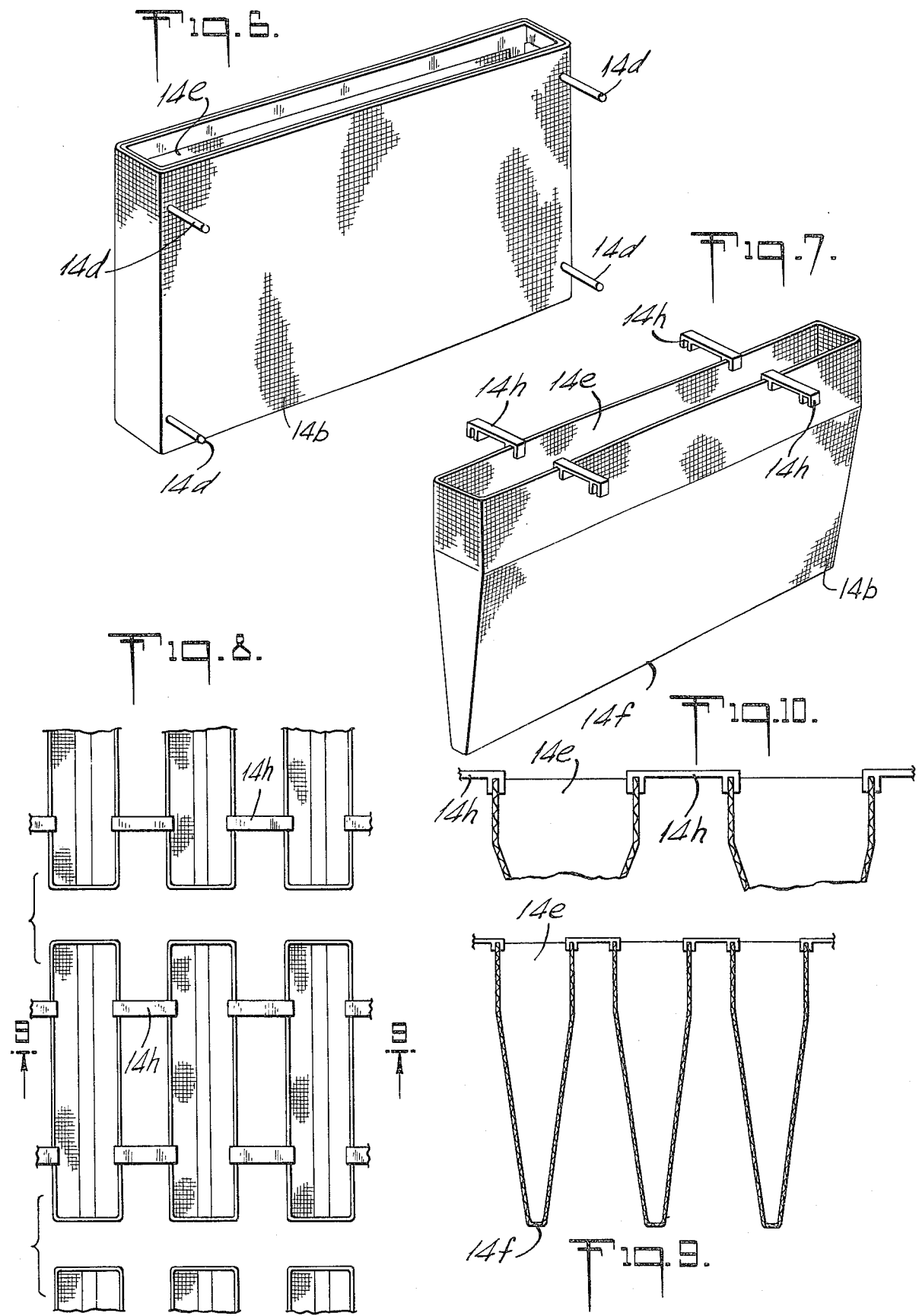

TROUGH-TYPE SCALE TRAPS

BACKGROUND OF THE INVENTION

In a number of refining processes, for example hydrodesulfurization, reforming, hydrocracking and others, a liquid or gas feed stream is contacted with a bed of solid particles which catalyze the desired reaction. Such reactors are often used also in chemical processes. Since the catalyst particles used are often quite small, to obtain the most effect of relatively expensive catalyst materials and to insure good contacting, the passageways through the catalyst bed are relatively narrow and are subject to plugging by extraneous solid materials which may enter the bed or be formed therein. It has been found in many processes that corrosion products, scale, and other solid materials accumulate in the catalyst bed and are not washed through. Over a period of time, these particles build up and block flow which causes channeling through the catalyst bed, rendering it less effective and increasing pressure drop substantially. After a period of operation the catalyst bed becomes so obstructed by the accumulation of solid particles that the operation must be stopped and the reactor vessel opened for removal of the accumulation of solid particles, often accompanied by replacement of a significant portion of the catalyst bed. In some processes, the on-stream period between cleanings may only be several months, substantially reducing the service factor and increasing the cost of operation.

That this has been a significant problem to the industry is indicated by the substantial number of patents which have issued covering distributors, scale traps and combinations thereof. A partial list of patents which represent prior art in this field are the following: U.S. Pat. Nos. 2,961,304, 3,006,740, 3,112,256, 3,146,189, 3,255,159, 3,431,084, 3,598,539, 3,607,000.

While it might be thought that a fine screen covering the entire reactor cross-section could be used to intercept fine particles coming into the reactor, this is not practical for both structural and functional reasons. A screen which is small enough to catch all of the very fine particles would be subject to very quick blinding, causing an even earlier shut-down that when operating with no screen at all. It has been found, however, that using a mesh screen on baskets which cover a large portion of the bed that the larger particles are collected, but smaller ones pass on through into the bed where they collect and in time will cause the difficulties previously mentioned, forcing a shut-down for cleaning. When this happens the screen and its supporting structure must be removed from the bed through relatively small manholes, usually having openings of only 18–24 inches. The scale traps and screens must be removed in order to clean the bed and to replace the upper layers of catalyst. Once this is accomplished, then the traps must be cleaned and replaced in order to continue operation. U.S. Pat. Nos. 3,006,740 and 3,598,539 represent typical prior art scale traps which have been used with reasonable success. It will be appreciated, however, that such structures are complex and are thus not only costly to install but difficult to remove and to clean and replace at a time when speed is essential to minimizing down time.

SUMMARY OF THE INVENTION

The present invention is an improved scale trap which is not only easier and simpler to construct, install, remove and replace, but is also more effective than the prior art in that it has a larger screen area, larger volumetric capacity for scale and is designed to minimize the possibility of bridging over of fine particulates which do pass through the scale traps.

Trough-type scale traps of the invention are best understood with relation to the figures and detailed description which follows. In general, scale traps according to the invention are built in the shape of parallel troughs located chordally across the upper portion of the reactor normal to the direction of flow and partially immersed within the upper part of the catalyst bed. The structure inherently is simpler to construct and to remove and replace through the relatively small manways which are typically available for this purpose.

In one embodiment, the trough is an elongated rectangular parallelepiped having a bottom area substantially the same as that of the rectangular inlet opening. In another embodiment, the bottom area is substantially smaller than the rectangular inlet opening and the sides of the trough taper inwardly to the reduced size rectangular bottom.

BRIEF DESCRIPTION OF THE DRAWINGS

FIG. 1 is a sectional elevation view of the upper portion of a typical reactor illustrating the general position of the trough-type scale traps.

FIG. 2 is a plan view taken substantially along line 2—2 of FIG. 1.

FIG. 3 is an enlarged sectional view of a portion of FIG. 2.

FIG. 4 is a sectional view, taken substantially along line 4—4 of FIG. 3.

FIG. 5 is another sectional view, taken substantially along line 5—5 of FIG. 3.

FIG. 6 shows one element of one embodiment of the invention.

FIG. 7 shows one element of an alternative embodiment of the invention.

FIG. 8 shows a plan view of an alternative embodiment of the invention.

FIG. 9 is a sectional view taken substantially along line 9—9 of FIG. 8. FIG. 10 is an enlarged section of FIG. 9.

DESCRIPTION OF THE PREFERRED EMBODIMENTS

FIG. 1 shows the upper portion of a typical reactor 10 in which the present invention has been installed. The reactor vessel would ordinarily be an elongated cylinder 10a with heads 10b welded on each end. The catalyst bed 12 rests on a support (not shown) and is installed either through the top of the vessel or through a side manway (not shown). The large opening 10c at the top of the vessel will serve as an inlet nozzle and may also be adapted for entry for maintenance purposes as will be discussed. The typical manway opening will be 18–24 inches in diameter so that screens and supports must be designed in such a way as to pass through these openings. Catalyst beds often are topped by a relatively shallow layer, say 6 inches, of large size inert balls in order to help to stabilize the bed and to minimize shifting. Scale traps 14 according to the invention or those of the prior art will ordinarily be installed in such a way as to be partially submerged in the layer of inert balls or directly into the catalyst itself. Feed will enter at the top nozzle 10c of the reactor and be distributed by any one of a number of means as uniformly as possible across the catalyst bed 12, entering it through the screened scale traps 14 as shown. It will be appreciated that simply by providing traps of any shape additional surface area will be gained over that which would be available from a flat screen placed directly across the cross-section of the vessel.

FIG. 2 shows a sectional view of FIG. 1 in which the general distribution lay-out of the trough scale traps of the invention are shown as being in a parallel array disposed chordally across the entire cross-section of the vessel normal to the direction of flow, so that feed entering the vessel must pass through one of the scale traps 14.

From FIG. 3 it will be appreciated that the individual traps 14 are in the form of elongated rectangular troughs fabricated of steel rod with such flat framing 14a as is necessary in order to mount the screen 14b properly thereon. The individual traps must be removable, but in service they are interlocked and supported by tie rods 14d passing from one to the other. Other connecting members could be used, for example, the interconnecting clips 14h of FIGS. 7 and 10. It should be noted that although in the preferred embodiment no screen is used between the individual traps, this could be done if desired.

FIG. 4 illustrates in an elevation view a pair of typical scale traps according to the invention. It will be appreciated from this figure, which is approximately to scale, that the amount of screen added by means of the trough shaped scale traps is very large indeed. They will typically be three to four times deeper than their width and both the sides and bottom are screened to permit passage of the feed stream through the scale trap. When the trap is new, flow will ordinarily enter through the opening 14e at the top and pass directly down and out the screen bottom 14f. As solid particles are trapped the bottom 14f gradually will become blinded so that flow will be diverted through the side walls 14g. This will prevent the screen from being blinded for a considerable length of time. However, it must be appreciated that fine particles will be continually passing through the side walls 14g of the trap and they have been found accumulating in the bed 12 near the trap 14. Accordingly, the space 16 between scale traps tends to become filled with fine particles and it is believed that bed plugging often may occur by simply filling the relatively narrow space between the traps. Thus to obtain more open area for trapping solids the design creates a new bed plugging problem owing to the proximity of one trap to another.

In FIG. 5, the structure on which the wire mesh is mounted is shown. It will be obvious that in any such trap no more solid support framing should be provided than is essential to provide a maximum open area for flow of feed through the trap.

FIG. 6 shows a single element of one embodiment of the invention in which the narrow trough-like structure is a rectangular parallelepiped having the same cross-sectional area at the opening 14e and at the bottom 14f. The additional surface area for screening which is provided by a trap of this configuration is readily seen in FIG. 6. In this configuration, substantially more surface area is provided than a typical conical or cylindrical basket of the prior art. Accordingly, it is expected that scale traps according to this design will operate for substantially longer periods of time before bed plugging or screen plugging becomes a problem.

FIG. 7 illustrates an alternative embodiment intended to counter the previously mentioned tendency for fine particles to accumulate between the scale traps and to bridge over, effectively plugging the bed. In this embodiment, the base of the trough element is substantially smaller in cross-sectional area than is the rectangular inlet opening 14c. Thus, the sides of the scale trap extend vertically downward for a short distance, which may be coincident with the position of the inert balls, and then begin to taper downwardly toward the reduced area of the bottom 14f. In a typical design, the area of the base 14f may be only 1/6 that of the inlet opening and the angle of the taper about 8° from the vertical. The result of such construction can be appreciated from FIG. 9 wherein a set of three of such baskets are illustrated. By reducing the cross-sectional area of the base it will be appreciated that a substantial increase in width open for flow between adjacent bases has been provided. Thus, if accumulation of fine particles between the trough shaped baskets is the limiting factor in determining run length of the reactor it would be expected that the tapered trough of FIG. 9 would be superior to that of FIG. 6. Alternatively, if the limiting factor were the amount of screen area provided rather than inter-trough plugging, then the configuration of FIG. 6 would be expected to be superior. FIGS. 7 and 9 also illustrate an interconnecting clip 14h which can be used to space the trough units after they are positioned in the bed. Such clips are easy to install and remove, which is important in reducing reactor downtime.

Another alternative embodiment, not shown here, would apply the same principles at the ends of the trough so that, as in FIG. 8, instead of the individual trough sections being immediately adjacent to each other, they could be spaced slightly apart, the bottom of the trough reduced still further by reducing its length, and the narrow sides of the trough tapered inwardly to conform to the reduced bottom. Thus, additional space would be provided at the ends of the trough in much the same manner as it was provided in FIG. 9 between the sides. The interconnecting clips 14h of FIGS. 7 and 9 are also illustrated in FIG. 8.

By carefully sizing the trough-type scale traps of the invention so they can pass through the normal manway opening, many fewer scale traps are provided than are required with the typical prior art cylindrical or conical shaped traps. Thus, the labor required to construct them originally and more importantly, to disassemble, remove and reassemble the scale traps during reactor shutdowns has been substantially improved with this construction. Further, the volumetric capacity of accumulation of the scale is significantly more than that of the prior art designs and the screen surface area is also significantly increased.

While the foregoing configurations are for illustration of the preferred alternate embodiments, they should not be considered to define the extent of the invention which is defined by the claims which follow.

What is claimed is:

1. An array of scale traps disposed normal to the direction of flow of incoming feed entering catalyst beds in a reactor vessel for filtering particles contained in said feed and preventing them from entering said catalyst beds which are subject to plugging by said particles comprising:

a. a plurality of interlocked parallel scale traps, each of said traps disposed in a chordal direction across the cross-section of said reactor vessel and including a support frame which has a troughlike configuration in the direction of incoming feed flow, said frame including a flat elongated rectangular top having an opening normal to said incoming feed and a flat elongated rectangular bottom having an opening parallel to and downstream of said top opening, said frame having sides connecting said top to said bottom, said traps transversely spaced apart a sufficient distance along the longer side of said top so that plugging of said beds is minimized;

b. screen wire mesh fastened only to said frame of each of said traps and covering only said sides and said bottom whereby fluid entering said top opening is filtered by said trap and passes out of said trap through said wire mesh; and c. removable means for directly interconnecting adjacent ones of said scale traps in said array so that each of said traps is removable from said array upon disconnection of said removable means therefrom.

2. The scale trap of claim 1 wherein said trap is in the form of a rectangular parallelpiped.

3. The scale trap of claim 1 wherein said bottom is smaller than said top and comprises a rectangle of the same length and narrower than said top and said sides along the length of said top and bottom slope inward such that each of said traps has a trapezoidal configuration in the direction of said feed flow.

4. The scale traps of claim 3 where the slope of said sides has an angle of about 8° with the vertical.

5. The scale trap of claim 4 wherein said bottom has an area of about 1/6 of that of said top.

6. The scale trap of claim 1 wherein said bottom is a rectangle having both length and width smaller than that of said top and all of said sides slope inward from said top toward said bottom.

7. A reactor vessel having an inlet for admitting a feed fluid and an outlet for discharging said fluid and a catalyst bed disposed between said inlet and outlet for promoting a reaction of said feed fluid wherein said fluid is passed through a parallel array of interconnected scale traps, each of said traps removable from said array and disposed within said reactor vessel at the inlet side of said catalyst bed in a plane normal to the direction of flow of fluid therethrough and extending across the vessel whereby any fluid entering said catalyst bed must pass through said array, each of said scale traps comprising:

a. a support frame disposed in a chordal direction across the cross-section of said reactor vessel and at least a portion of which has a trapezoidal configuration in the direction of feed flow, said frame including a flat elongated rectangular top having an opening, a flat elongated rectangular bottom having an opening parallel to and downstream of said top opening, said frame having sides connecting said top to said bottom, said traps transversely spaced apart a sufficient distance along the longer side of said rectangular top so that plugging of said bed is minimized;

b. screen wire mesh fastened only to said frame of each of said traps and covering only said sides and said bottom whereby fluid entering said top rectangular opening is filtered by said traps and passes out of said trap through said wire mesh; and c. removable means for directly interconnecting adjacent ones of said scale traps in said array so that each of said traps is removable from said array upon disconnection of said removable means therefrom.

8. The reactor vessel of claim 7 including a plurality of chordally adjacent scale traps in said parallel array, which are directly adjacent to others of said traps along the smaller sides of said top.

9. The reactor vessel of claim 7 including a plurality of chordally adjacent scale traps in said parallel array, which are spaced apart along the smaller sides of said top to permit space for accumulation of fine particles in said catalyst bed.

10. The reactor vessel of claim 7 wherein said bottom is narrower than said top and said sides of said traps extend normal to said top for a distance and taper inwardly therefrom toward said bottom.

* * * * *